Figure 2:
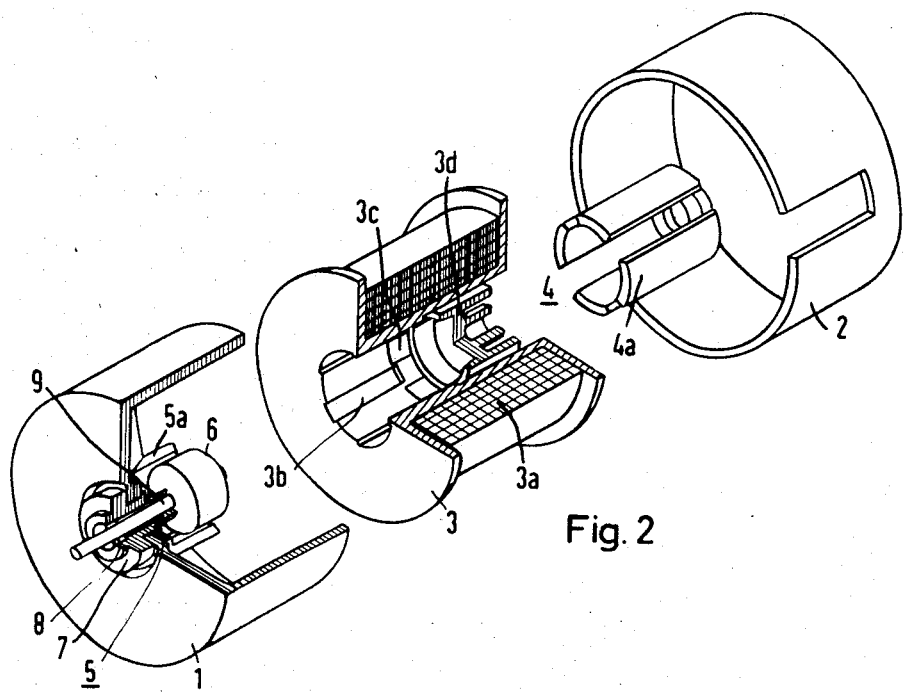

United States Patent
Kappius et al.

[15] 3,691,414
[45] Sept. 12, 1972

[54] STEPPING MOTOR FOR SMALL DRIVING POWER

[72] Inventors: Friedrich Kappius, Reiner Kristen, Hanns Ott; Heinz Reinholtz, all of Nuernberg, Germany

[73] Assignee: Siemens Aktiengesellschaft Berlin and Munich, Germany

[22] Filed: May 21, 1971

[21] Appl. No.: 145,626

[30] Foreign Application Priority Data

June 3, 1970 Germany..........P 20 27 138.9

[52] U.S. Cl..................................310/49, 310/164
[51] Int. Cl.............................................H02k 37/00
[58] Field of Search..................310/40 MM, 49, 164

[56] References Cited

UNITED STATES PATENTS 3,462,668   8/1969   Tomson..................310/164 X
3,448,306   6/1969   Murray.......................310/83

*Primary Examiner*—D. X. Sliney
*Attorney*—Curt M. Avery, Arthur E. Wilfond, Herbert L. Lerner and Daniel J. Tick

[57] ABSTRACT

The stator winding carrier of a stepping motor has guide slots formed in an axially extending bore formed therein. The guide slots extend substantially parallel to the axis of the carrier. A thrust bearing plate is formed in the carrier across the bore. The pole tips of each of first and second claw pole stator parts of different widths are fittedly inserted in corresponding guide slots of the carrier with the axial position of the rotor being determined by the plate.

6 Claims, 2 Drawing Figures

STEPPING MOTOR FOR SMALL DRIVING POWER

DESCRIPTION OF THE INVENTION

The invention relates to a stepping motor for small driving power.

The stepping motor of the invention comprises a permanent magnet rotor having poles of alternating polarity at its circumference. A hollow cylinder stator winding carrier has a stator winding mounted thereon and has an axial bore formed therethrough. A first motor housing has a first claw pole stator part having pole tips provided at different pole divisions. A second motor housing has a second claw pole stator part having pole tips provided at different pole divisions. The first and second claw pole stator parts are positioned in the bore of the stator winding carrier, are energized by the stator winding, and overlap by a small amount in axial direction. The first and second motor housings form a magnetic yoke.

The construction of stepping motors of the aforedescribed type, which require a driving power of a few milliwatts, is subjected to low tolerance limits which require great maintenance care.

German published application No. 1,538,705 discusses a stepping motor for small driving power having a permanent rotor which may be axially shifted and is adjustably mounted. The stepping motor further comprises two axially displaceable and mutually rotatable claw pole stator parts. The permanent magnet rotor and the claw pole stator parts are suitably adjusted after the motor is mounted, in order to provide maximum operating values. This type of adjustment requires a considerable expenditure of time and equipment and is economically unacceptable in mass production.

An object of the invention is to provide a stepping motor for small driving power having a mounting which does not require separate adjustments of the claw pole stator parts relative to each other and to the permanent magnet rotor.

Another object of the invention is to provide a stepping motor for small driving power which is of simple structure and functions with efficiency, effectiveness and reliability.

Still another object of the invention is to provide a stepping motor for small driving power which is economical in manufacture and operation.

In accordance with the invention, a stepping motor for small driving power has a permanent magnet rotor having poles of alternating polarity at its circumference. A hollow cylinder stator winding carrier has a stator winding mounted thereon and has an axial bore formed therethrough. A first motor housing has a first claw pole stator part having pole tips provided at different pole divisions and a second motor housing has a second claw pole stator part having pole tips provided at different pole divisions. The first and second claw pole stator parts are positioned in the bore of the stator winding carrier, are energized by the stator winding, and overlap by a small amount in axial direction. The first and second motor housings form a magnetic yoke. In accordance with the invention, the stator winding carrier has guide slots formed in the bore thereof extending substantially parallel to the axis thereof and a thrust bearing plate formed therein across the bore. The pole tips of the first claw pole stator part have widths different from the pole tips of the second claw pole stator part. The pole tips of each of the first and second claw pole stator parts are fittedly inserted in corresponding guide slots of the stator winding carrier with the axial position of the rotor being determined by the thrust bearing plate. The guide slots of the stator winding carrier have narrow tolerances.

The thrust bearing plate comprises a partition of the stator winding carrier extending across the bore thereof.

Only one of the first and second claw pole stator parts is firmly affixed to its motor housing.

The thrust bearing plate comprises a partition of the stator winding carrier extending across the bore thereof. The first motor housing has a radial bearing mounted therein having two axially spaced bearing areas rotatably mounting the rotor on a side turned away from the thrust bearing plate.

The stator winding carrier comprises synthetic material and the thrust bearing plate comprises synthetic material.

The thrust bearing plate may be a separate plate tightly affixed to the stator winding carrier or may comprise a wall or partition of said carrier, as hereinbefore mentioned. The tight connection of one of the claw pole stator parts to its motor housing prevents mechanical over determination of the motor housings relative to each other. The insertion of the pole tips in guide slots having narrow tolerances, as hereinbefore mentioned, eliminates the need for special fastening parts for affixing the stator winding carrier to the claw pole stator parts.

Figure 1:
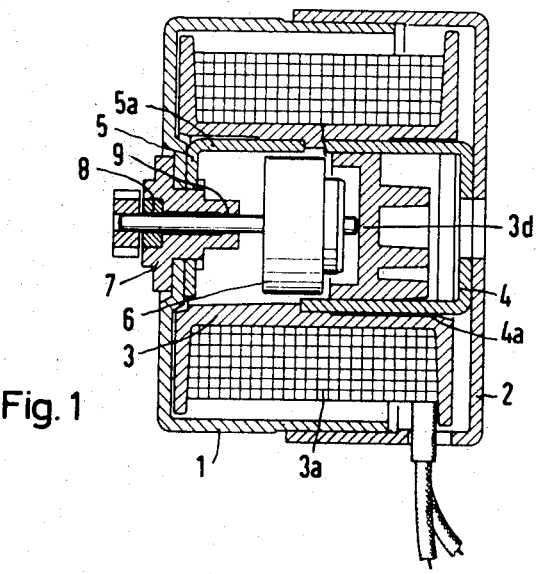

In order that the invention may be readily carried into effect, it will now be described with reference to the accompanying drawing, wherein:

FIG. 1 is a sectional view of an embodiment of the stepping motor of the invention; and FIG. 2 is an exploded view of the stepping motor of FIG. 1.

In the FIGS., the same components are identified by the same reference numerals.

In the FIGS., a first motor housing 1 and a second motor housing 2 enclose a hollow cylindrical stator winding carrier 3. A stator winding 3a is mounted on the stator winding carrier 3. The stator winding carrier 3 has an axial bore formed therethrough. A plurality of guide slots 3b and 3c are formed in the stator winding carrier 3 around the surface of the bore formed therethrough. The guide slots 3b and 3c are of different widths.

The first motor housing 1 has a first claw pole stator part 5 having pole tips 5a provided at different pole divisions. The second motor housing 2 has a second claw pole stator part 4 having pole tips 4a provided at different pole divisions. The first and second motor housings 1 and 2 form a magnetic yoke. The first and second claw pole stator parts 5 and 4 are positioned in the bore of the stator winding carrier 3, are energized by the stator windings 3a, and overlap by a small amount in axial direction.

The pole tips 5a of the first claw pole stator part 5 and the pole tips 4a of the second claw pole stator part 4 are fittedly inserted in corresponding guide slots 3b and 3c of the stator winding carrier 3. The guide slots 3b and 3c have narrow tolerances. In FIG. 1, the pole tips 5a of the first claw pole stator part 5 are turned into the plane of illustration.

A portion of wall 3d is provided in the stator winding carrier 3 and extends across the axial bore thereof. The portion 3d functions as a thrust bearing plate for the permanent magnet rotor parts of the motor. The thrust bearing plate 3c is axially positioned at a point which is selected to position the permanent magnet rotor 6 in a specific tolerated area for axial overlapping of the pole tips 5a and 4a.

The first motor housing has a radial bearing 7 mounted therein. The radial bearing 7 has two axially spaced bearing areas 8 and 9 rotatably mounting the rotor 6. The rotor 6 is mounted on a side turned away from the thrust bearing plate 3d. The radial bearing 7 eliminates the need for a second separate radial bearing.

In order to avoid a mechanical over determination, only the first claw pole stator portion 5 is firmly affixed to the first motor housing 1. The motor housing 2 bears loosely against the second claw pole stator part 4. In order to improve the operating characteristics of the motor such as, for example, startup, acceleration, and the like, the pole tips 5a of the first claw pole stator part 5 are made narrower than the pole tips 4a of the second claw pole stator part 4. Furthermore, the first and second claw pole stator parts 5 and 4 are mutually turned by an angle which is electrically less than 180°.

In the stepping motor of the invention, the stator winding carrier 3 alone determines the position of the permanent magnet rotor 6 relative to the first and second claw pole stator parts 5 and 4, as well as the position of said claw pole stator parts relative to each other. Thus, when the stator winding carrier 3 is constructed with suitable precision, the other parts will not require adjustment. Good measuring precision is provided especially when the partition 3d of the stator winding carrier 3 comprises synthetic material and is molded with said carrier.

The entire stator winding carrier 3 preferably comprises synthetic material. The stepping motor of the invention may be mounted by merely assembling the individual parts. Since the wider pole tips 4a represent a smaller resistance in the magnetic yoke circuit of the magnetic field of the permanent magnet rotor 6, said rotor is pulled by the magnetic forces toward said pole tips and is thus pressed against the thrust bearing plate 3d. This eliminates the need for special limiting components.

While the invention has been described by means of a specific example and in a specific embodiment, we do not wish to be limited thereto, for obvious modifications will occur to those skilled in the art without departing from the spirit and scope of the invention.

We claim:

1. A stepping motor for small driving power having a permanent magnet rotor having poles of alternating polarity at its circumference, a hollow cylinder stator winding carrier having a stator winding mounted thereon and having an axial bore formed therethrough, a first motor housing having a first claw pole stator part having pole tips provided at different pole divisions and a second motor housing having a second claw pole stator part having pole tips provided at different pole divisions, the first and second claw pole stator parts being positioned in the bore of the stator winding carrier, energized by the stator winding and overlapping by a small amount in axial direction, and the first and second motor housings forming a magnetic yoke, wherein the stator winding carrier has guide slots formed in the bore thereof extending substantially parallel to the axis thereof and a thrust bearing plate formed therein across said bore, and comprising a partition of the stator winding carrier extending across the bore thereof, the pole tips of the first claw pole stator part having widths different from the pole tips of the second claw pole stator part and the pole tips of each of the first and second claw pole stator parts being fittedly inserted in corresponding guide slots of the stator winding carrier with the axial position of the rotor being determined by the thrust bearing plate.

2. A stepping motor as claimed in claim 2, wherein only one of the first and second claw pole stator parts is firmly affixed to its motor housing.

3. A stepping motor for small driving power having a permanent magnet rotor having poles of alternating polarity at its circumference, a hollow cylinder stator winding carrier having a stator winding mounted thereon and having an axial bore formed therethrough, a first motor housing having a first claw pole stator part having pole tips provided at different pole divisions and a second motor housinghaving a second claw pole stator part having pole tips provided at different pole divisions, the first and second claw pole stator parts being positioned in the bore of the stator winding carrier, energized by the stator winding and overlapping by a small amount in axial direction, and the first and second motor housings forming a magnetic yoke, wherein the stator winding carrier has guide slots formed in the bore thereof extending substantially parallel to the axis thereof and a thrust bearing plate formed therein across said bore, the pole tips of the first claw pole stator part having widths different from the pole tips of the second claw pole stator part and the pole tips of each of the first and second claw pole stator parts being fittedly inserted in corresponding guide slots of the stator winding carrier with the axial position of the rotor being determined by the thrust bearing plate, the thrust bearing plate comprising a partition of the stator winding carrier extending across the bore thereof, and the first motor housing having a radial bearing mounted therein having two axially spaced bearing areas rotatably mounting the rotor on a side turned away from the thrust bearing plate.

4. A stepping motor as claimed in claim 2, wherein the stator winding carrier comprises synthetic material.

5. A stepping motor as claimed in claim 3, wherein the thrust bearing plate comprises synthetic material.

6. A stepping motor as claimed in claim 4, wherein the guide slots of the stator winding carrier have narrow tolerances.

* * * * *